US009344926B2

(12) United States Patent  
Pei

(10) Patent No.: US 9,344,926 B2
(45) Date of Patent: May 17, 2016

(54) BASE STATION AND HANDOVER PROCESSING METHOD FOR DIGITAL TRUNKING COMMUNICATION

(75) Inventor: Fan Pei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 689 days.

(21) Appl. No.: 13/582,309

(22) PCT Filed: Oct. 13, 2010

(86) PCT No.: PCT/CN2010/077718
§ 371 (c)(1),
(2), (4) Date: Aug. 31, 2012

(87) PCT Pub. No.: WO2011/113273
PCT Pub. Date: Sep. 22, 2011

(65) Prior Publication Data
US 2012/0327903 A1 Dec. 27, 2012

(30) Foreign Application Priority Data

Mar. 16, 2010 (CN) .......................... 2010 1 0150640

(51) Int. Cl.
H04W 4/00 (2009.01)
H04W 36/00 (2009.01)
(52) U.S. Cl.
CPC ................. *H04W 36/0055* (2013.01)
(58) Field of Classification Search
USPC .......................................... 370/331
See application file for complete search history.

(56) References Cited

U.S. PATENT DOCUMENTS

| 7,620,411 | B2 | 11/2009 | Shiga | |
|---|---|---|---|---|
| 2004/0162046 | A1* | 8/2004 | Yamauchi et al. | 455/260 |
| 2008/0188225 | A1 | 8/2008 | Park et al. | |
| 2010/0062769 | A1* | 3/2010 | Hidaka | 455/436 |
| 2010/0124924 | A1* | 5/2010 | Cheng et al. | 455/434 |
| 2010/0232327 | A1* | 9/2010 | Kim et al. | 370/311 |

FOREIGN PATENT DOCUMENTS

| CN | 1582037 | A | | 2/2005 |
|---|---|---|---|---|
| CN | 101640847 | A | | 2/2010 |
| CN | 101640847 | A | * | 2/2010 |
| CN | 101835214 | A | | 9/2010 |
| KR | 10-2008-0037856 | A | | 5/2008 |

OTHER PUBLICATIONS

International Search Report issued in PCT/CN2010/07718 (priority application) on Jan. 20, 2011.

* cited by examiner

*Primary Examiner* — Faruk Hamza
*Assistant Examiner* — Shah R Zaman
(74) *Attorney, Agent, or Firm* — Jenkins, Wilson, Taylor & Hunt, P.A.

(57) ABSTRACT

The present invention discloses a base station and a handover processing method for digital trunking communication. The handover processing method comprises: a base station transmitting a System Parameter and Neighbor Channel Assignment Message (SNCAM) to a terminal at a normal period; the base station receiving a handover request from the terminal; the base station transmitting the SNCAM to the terminal at a preset period; the preset period is set to be shorter than the normal period and ensures that the power consumption of the base station is lower than a threshold which leads to power overload. The present invention has increased the possibility that the terminal receives the SNCAM, and can also avoid the power overload of the system, thus not only the user experience is improved, but also the life of the base station is prolonged.

8 Claims, 4 Drawing Sheets

BASE STATION AND HANDOVER PROCESSING METHOD FOR DIGITAL TRUNKING COMMUNICATION

CROSS-REFERENCE TO RELATED APPLICATIONS

This application is filed under the provisions of 35 U.S.C. §371 and claims the priority of International Patent Application No. PCT/CN2010/077718 filed on Oct. 13, 2010, and of Chinese Patent Application No. 201010150640.2 filed on Mar. 16, 2010. The disclosures of the foregoing international patent application and Chinese patent application are hereby incorporated by reference herein in their respective entireties.

FIELD OF THE INVENTION

The present invention relates to the communication field, and in particular to a base station and a handover processing method for digital trunking communication.

BACKGROUND OF THE INVENTION

Currently, when performing an adjacent cell handover in a Code Division Multiple Addressing (CDMA) system using the terminal independent handover, firstly, a base station transmits a System Parameter and Neighbor Channel Assignment Message (SNCAM) to a terminal to assist the terminal to perform the neighbor channel handover; and then when the terminal detects that the signal of a certain cell is higher than a handover threshold and the SNCAM received by the terminal carries the information of this cell, the terminal will hand over to this cell directly without message interaction with the base station. In the above handover process, the base station is only responsible for transmitting the SNCAM and the terminal decides whether to perform handover.

Specifically, when the terminal sends a call, the base station transmits the SNCAM to the terminal through an air interface and also transmits the SNCAM to all the terminals under the carrier sector. In practical application, in order to enable the terminal to receive the SNCAM, the base station should transmit the SNCAM periodically to increase the possibility that the terminal receives the SNCAM.

A terminal in a complex wireless environment can only wait for a next SNCAM transmitted by the base station after losing the SNCAM, while in practical application, the time that the terminal waits for the next SNCAM is rather long, which will influence the user experience. Or in the handover process, since the terminal can not receive the SNCAM in time, the call-drop of the terminal may occur, which will reduce handover performance of the network.

The inventor found that in related art, if simply shorten the period, the power consumption of the base station will increase, which may cause power overload to the system and influence the capacity of the CDMA system.

SUMMARY OF THE INVENTION

The present invention provides a base station and a handover processing method for a digital trunking system so as to solve at least one of the problems above.

According to one aspect of the present invention, a handover processing method for digital trunking communication is firstly provided, which comprises: a base station transmitting an SNCAM to a terminal at a normal period; the base station receiving a handover request from the terminal; and the base station adjusting itself to transmit the SNCAM to the terminal at a preset period, wherein the preset period is set to be shorter than the normal period and ensures that the power consumption of the base station is lower than a threshold which leads to power overload.

Before the base station adjusting itself to transmit the SNCAM at the preset period, the handover processing method further comprises: the base station determining a handover initiated by the handover request to be a handover initiated by the terminal independently according to the service type indication information carried by the handover request.

The process that the base station adjusting itself to transmit the SNCAM at the preset period comprises:

the base station determining an adjustment period according to the normal period and a period shortening step size;

the base station judging whether the adjustment period is shorter than a minimum transmission period, and if it is, the minimum transmission period is taken as the preset period, otherwise the adjustment period is taken as the preset period; and the base station transmits the SNCAM to the terminal at the preset period.

The process that the base station determining the adjustment period according to the normal period and the preset period shortening step size comprises: determining the adjustment period as the difference of the normal period and the period shortening step size.

The process that the base station determining the adjustment period according to the normal period and the preset period shortening step size comprises: determining the adjustment period as the product of the normal period and the period shortening step size.

The period shortening step size above is 70%.

The minimum transmission period is set to be corresponding to the threshold.

The handover processing method above further comprises: the base station receiving a handover completion request from the terminal; and the base station adjusting itself to transmit the SNCAM to the terminal at the normal period.

According to another aspect of the present invention, a base station is provided, which comprises: a normal transmission module, a receiving module and an adjustment module, wherein, the normal transmission module is configured to transmit an SNCAM to a terminal at a normal period;

the receiving module is configured to receive a handover request from the terminal and trigger an adjustment module when receiving the handover request from the terminal; and the adjustment module is configured to adjust the base station to transmit the SNCAM to the terminal at a preset period, wherein the preset period is set to be shorter than the normal period and ensures that power consumption of the base station is lower than a threshold which leads to power overload.

The adjustment module above can further comprise: a determination module, a setting module and a transmission module, wherein, the determination module is configured to determine an adjustment period according to the normal period and a period shortening step size;

the setting module is configured to judge whether the adjustment period is shorter than a minimum transmission period, if it is, the minimum transmission period is taken as the preset period, otherwise the adjustment period is taken as the preset period; and the transmission module is configured to transmit the SNCAM to the terminal at the preset period.

By virtue of the base station and the handover processing method for a digital trunking system of the present invention, a base station shortens the period at which it transmits an SNCAM to a terminal when receiving a handover request initiated by the terminal, and also ensures that the power consumption of the base station is lower than a threshold which leads to power overload, thus the possibility that the terminal receives the SNCAM when the terminal performs a handover is increased, and the power overload of the system can be avoided at the same time, not only the user experience is improved, but also the life of the base station is prolonged.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The present invention will be further illustrated hereinafter in conjunction with embodiments and accompanying drawings. It should be noted that the embodiments in the present invention and the features in the embodiments can be combined with each other if there is no conflict.

Figure 1:
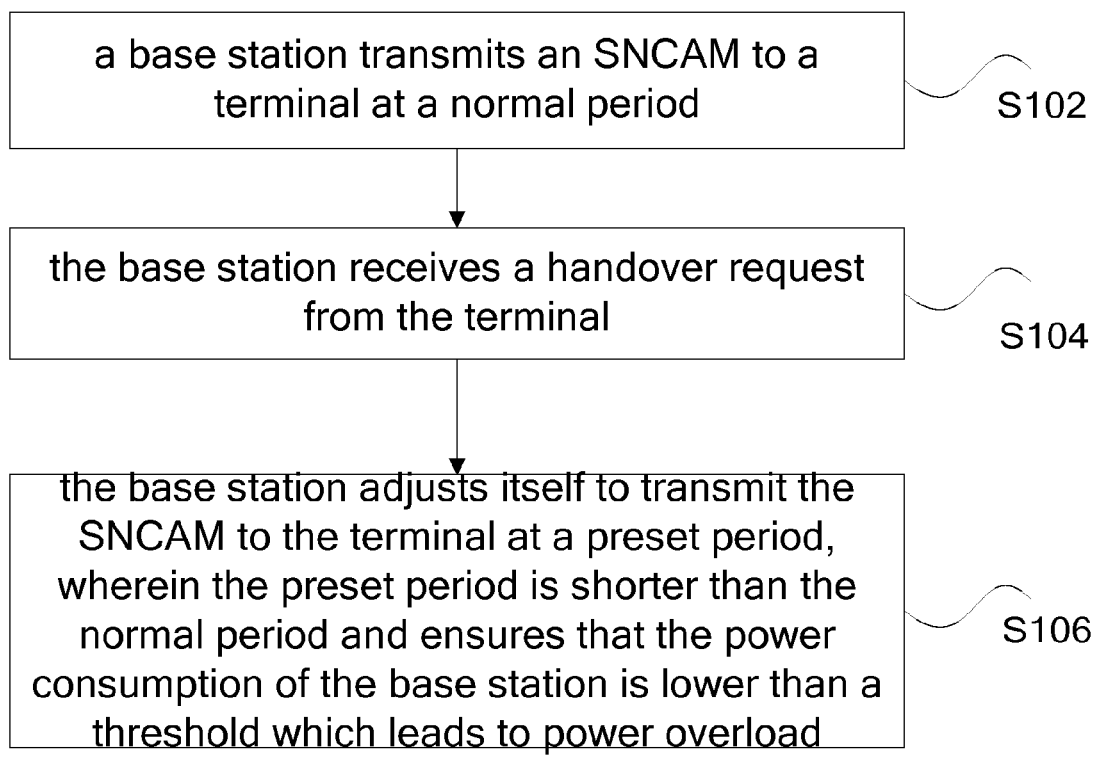
FIG. 1 is a flowchart of a handover processing method for a digital trunking system according to an embodiment of the present invention.

FIG. 1 is a flowchart of a handover processing method for a digital trunking system according to an embodiment of the present invention. As shown in FIG. 1, the above handover processing method mainly comprises the following steps (S102-S106):

S102: a base station transmits an SNCAM to a terminal at a normal period;

S104: the base station receives a handover request from the terminal; and

S106: the base station adjusts itself to transmit the SNCAM to the terminal at a preset period, wherein the preset period is set to be shorter than the normal period and ensures that power consumption of the base station is lower than a threshold which leads to power overload.

In related art, if simply shorten the period, the power consumption of the base station will increase, which may cause power overload to the system and influence the capacity of the CDMA system. However, when the preset period is set in this embodiment, the preset period is set to be shorter than the normal period, and the preset period can ensure that the power consumption of the base station is lower than a threshold which leads to power overload. This reasonable setting solves the above problem in the related art, thus the SNCAM transmission period of the base station is relatively short when the terminal performs a handover, and the time that the user terminal waits for the SNCAM will not be too long, in this way, user experience can be improved and it can ensure that the power consumption of the base station is limited within a reasonable range.

Currently, there are two modes for a terminal to initiate a handover, wherein one is triggering by a base station and the other is triggering by the terminal independently. As to a handover triggered by the base station, the base station can transmit related information of the adjacent cell and system parameters to the terminal when triggering the terminal to initiate a handover, so the terminal does not need to obtain the related information through the SNCAM. Therefore, the base station does not need to adjust the SNCAM transmission period in this mode.

In order to reduce the frequency that the base station adjusts the SNCAM transmission period, preferably, in this embodiment of the present invention, the base station adjusts the SNCAM transmission period only when receiving a handover request initiated by a terminal independently. Therefore, in this embodiment of the present invention, the base station also needs to judge whether the current handover is a handover initiated by the terminal independently before adjusting the SNCAM transmission period. Specifically, the base station can determine the handover initiated by the handover request is a handover initiated by the terminal independently according to service type indication information carried by the handover request transmitted by the terminal, and then the base station can adjust the SNCAM transmission period after determining that the current handover is a handover initiated by the terminal independently. Thus, it ensures that the terminal can receive the SNCAM in time under the situation that the terminal initiates a handover independently.

Figure 2:
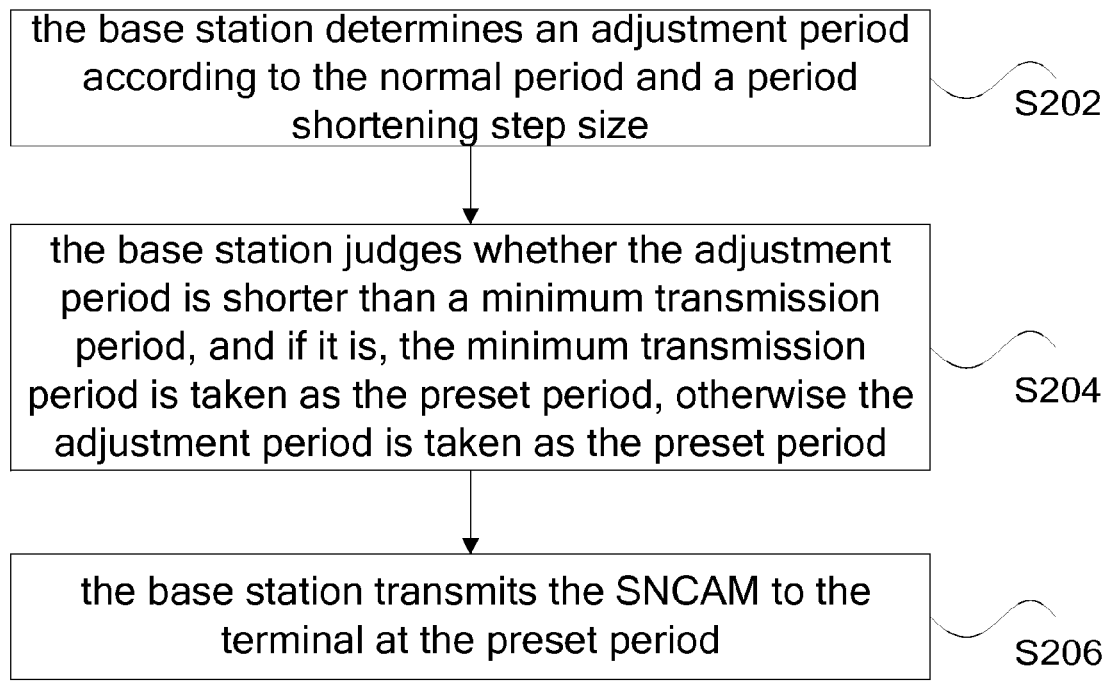
FIG. 2 is a flowchart of the process that a base station adjusts a preset period to transmit an SNCAM to a terminal according to an embodiment of the present invention.

In specific implementation, a base station can adjust the period of transmitting the SNCAM to a terminal according to the flow shown in FIG. 2, and the process can comprise the following steps (Step 202-Step 206):

Step 202: the base station determines an adjustment period according to the normal period and a period shortening step size;

Step 204: the base station judges whether the adjustment period is shorter than the minimum transmission period, if it is, the minimum transmission period is taken as the preset period, otherwise the adjustment period, which is determined in Step 202, is taken as the preset period; and Step 206: the base station transmits the SNCAM to the terminal at the preset period.

The SNCAM transmission period can be shortened through the process of adjusting the preset period above. Moreover, through the minimum transmission period, the power consumption of the base station can be guaranteed to be lower than a threshold which leads to power overload.

It should be noted that, although the steps above have described how the base station adjusts itself to transmit an SNCAM, it is not limited to this method in practical application. Those skilled in this art can also adjust the SNCAM transmission period by means of other methods as long as the adjusted period can ensure that the terminal can receive the SNCAM in time in the handover process and the power consumption of the base station is lower than a threshold which leads to power overload.

Preferably, in order to ensure the terminal can receive the SNCAM in time when performing handover as far as possible, after the base station transmits the SNCAM at the preset period above, if the base station still has not received a handover completion message transmitted by the terminal, the base station can continue to shorten the SNCAM transmission period, for example, the current base station transmits an SNCAM at an initial transmission period, at time A, and then the base station receives a handover request transmitted by the terminal, and adjusts the SNCAM transmission period to a first preset period according to the initial transmission period, after transmitting the SNCAM at this period for preset times (for instance, once), if the base station still has not received a handover completion message returned by the terminal, the base station shall further adjust the SNCAM transmission period. At this time, the base station adjusts the SNCAM transmission period to a second preset period according to the first preset period, and the base station transmits the SNCAM to the terminal at the second preset period, wherein the value of the second preset period is between the first preset period and the minimum transmission period.

In specific implementation, the method that the base station determines the adjustment period in Step 202 above comprises but is not limited to the following two modes:

(1) it is determined that the adjustment period as the difference of the normal period and the period shortening step size, i.e., the adjustment period=the normal period−the period shortening step size;

in the above, the period shortening step size can be determined according to the experience values in practical application, for example, the period shortening step size can be taken as 0.1.

(2) it is determined that the adjustment period as the product of the normal period and the period shortening step size, i.e., the adjustment period=the normal period*the period shortening step size.

When using Mode (2), preferably, the period shortening step can be set to be 70% and the minimum transmission period can be set to be corresponding to the threshold, wherein, the minimum transmission period ensures that the power consumption of the base station is lower than a threshold which leads to power overload. In the above, 70% is an optimal value obtained by the inventor after a great many of experiments, it not only can ensure that the power consumption of the base station is limited within a reasonable range, but also can realize a good effect of period shortening, thus better experience can be provided to users.

The base station can calculate the adjustment period in a flexible way according to actual requirements by using the two modes above.

In order to reduce the power consumption of the base station, preferably, in this embodiment of the present invention, when the terminal completes the handover, the base station can adjust the SNCAM transmission period back to the period before the handover, for example, after the base station receives the handover completion request from the terminal, it adjusts the SNCAM transmission period back to the normal period above. As a result, after the terminal completes the handover, the base station transmits an SNCAM at a relatively long period to reduce the power consumption of the base station in a non-handover state.

Figure 3:
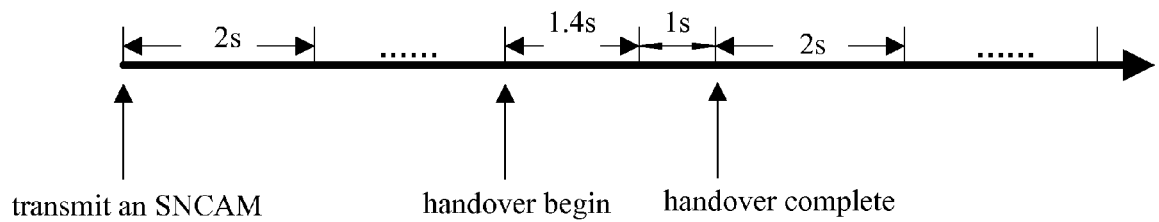
FIG. 3 is a schematic diagram of adjusting an SNCAM transmission period according to an embodiment of the present invention.

FIG. 3 is a schematic diagram of adjusting an SNCAM transmission period according to an embodiment of the present invention. The CDMA digital trunking communication system is taken as an example hereinafter in combination with FIG. 3 to further illustrate a handover processing method for a digital trunking system of the present invention, and the method comprises the following steps:

Step 1, a base station sets a normal period (i.e., a initial transmission period) to be 2 seconds, a period shortening step size to be 70% and the minimum transmission period to be 1 second, and then transmits an SNCAM at a period of 2 seconds;

Step 2, a terminal user requests to perform a trunking call;

Step 3, the terminal user is ready to perform a handover and transmits a handover request to the base station;

Step 4, when receiving the handover request, the base station determines the handover is initiated by the terminal independently according to the handover request;

Step 5, the base station adjusts the normal period to an adjustment period which is (2 seconds*70%)=1.4 seconds;

Step 6, the base station transmits an SNCAM to the terminal at the adjustment period, i.e., a period of 1.4 seconds;

Step 7, the base station has not received a handover completion message from the terminal at a certain period of time, and the base station continues to adjust the adjustment period which is 1.4*70%=0.98 second, and since 0.98 second is shorter than the minimum transmission period which is 1 second, the base station sets the current SNCAM transmission period to be 1 second;

Step 8, the base station transmits an SNCAM at a period of 1 second; and

Step 9, the base station receives a handover completion message from the terminal, and then resets the SNCAM transmission period to be 2 seconds and transmits an SNCAM at this period.

In practical application, the steps above are repeated when the next terminal is used for a call handover.

Figure 4:
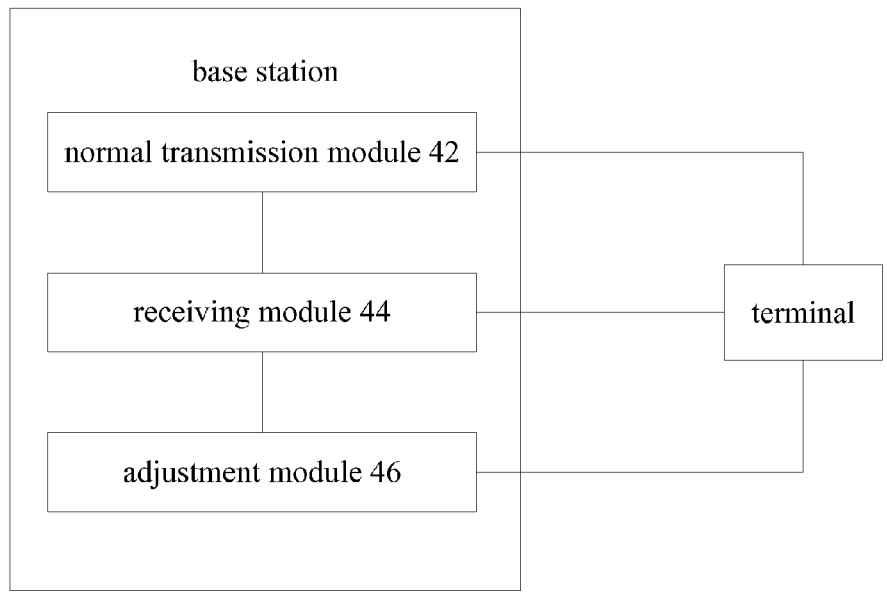
FIG. 4 is a block diagram of the structure of a base station according to an embodiment of the present invention.

FIG. 4 is a block diagram of the structure of a base station according to an embodiment of the present invention. The base station mainly comprises: a normal transmission module 42, a receiving module 44 and an adjustment module 46, wherein the normal transmission module 42 is configured to transmit an SNCAM to a terminal at a normal period; the receiving module 44 is configured to receive a handover request from the terminal and trigger the adjustment module 46 when receiving the handover request from the terminal; and the adjustment module 46 is configured to adjust the base station to transmit the SNCAM to the terminal at a preset period, wherein the preset period is set to be shorter than the normal period and ensures that the power consumption of the base station is lower than a threshold which leads to power overload.

The base station above can shorten the period at which it transmits the SNCAM to the terminal under the condition that the terminal requires a handover, thus the possibility that the user receives the message above is increased.

Figure 5:
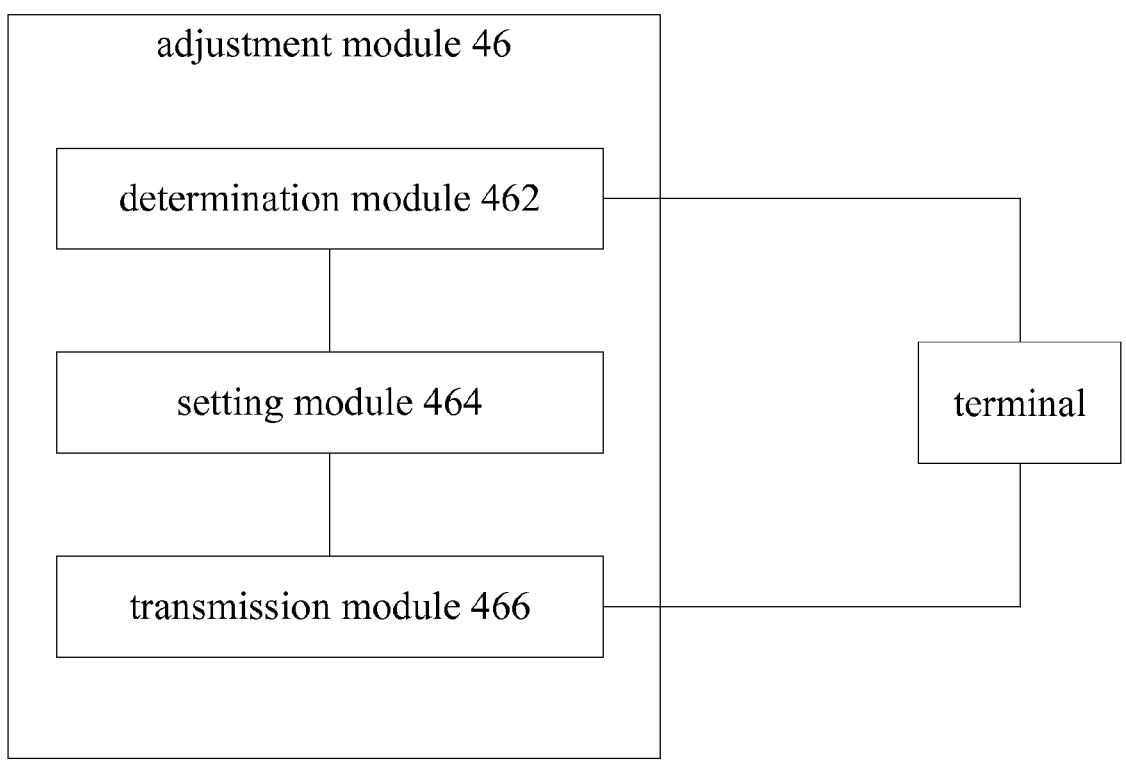
FIG. 5 is a block diagram of the structure of an adjustment module 46 in a base station according to an embodiment of the present invention.

Preferably, as shown in FIG. 5, the adjustment module 46 above can comprise: a determination module 462, a setting module 464 and a transmission module 466, wherein, the determination module 462 is configured to determine an adjustment period according to the normal period and a period shortening step size; the setting module 464 is configured to judge whether the adjustment period is shorter than the minimum transmission period, if it is, the minimum transmission period is taken as the preset period, otherwise the adjustment period is taken as the preset period; and the transmission module 466 is configured to transmit the SNCAM to the terminal at the preset period. The three sub-modules of the adjustment module 46 above can ensure that the terminal can receive the SNCAM when performing a handover, and avoid power consumption overload of the base station at the same time.

In summary, compared to the prior art, the embodiments of the present invention can shorten the period at which the base station transmits the SNCAM under the condition that the terminal performs a handover, and restore the period at which the base station transmits the SNCAM after the handover, thus the possibility that the user receives the SNCAM when the terminal performs a handover is increased, and the power consumption of the base station can be kept at a low level when handover is not needed, furthermore, the user experience is improved and the life of the base station is prolonged.

Apparently, those skilled in the art shall understand that the above-mentioned modules and steps of the present invention can be realized by using a general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they may be made into an integrated circuit module respectively, or a plurality of modules or steps thereof may be made into one integrated circuit module. In this way, the present invention is not limited to any particular combination of hardware and software.

The above description is only to illustrate the preferred embodiments but not to limit the present invention. Various alternative and changes to the present invention are apparent to those skilled in the art. The scope defined in claims shall comprise any modification, equivalent substitution and improvement within the spirit and principle of the present invention.

What is claimed is:

1. A handover processing method for digital trunking communication, the method comprising:
    transmitting a System Parameter and Neighbor Channel Assignment Message (SNCAM) from a base station to a terminal at a normal period;
    receiving at the base station a handover request from the terminal; and
    adjusting the base station to transmit the SNCAM to the terminal at a preset period, wherein the preset period is set to be shorter than the normal period and ensures that power consumption of the base station is lower than a threshold which would lead to power overload;
    wherein adjusting the base station comprises:
    determining at the base station an adjustment period according to the normal period and a period shortening step size;
    judging at the base station whether the adjustment period is shorter than a minimum transmission period, and if so, then the minimum transmission period is taken as the preset period, otherwise the adjustment period is taken as the preset period; and
    transmitting the SNCAM from the base station to the terminal at the preset period.

2. The method according to claim 1, wherein, prior to said adjusting of the base station, the method further comprises: determining at the base station a handover initiated by the handover request to be a handover initiated by the terminal independently according to service type indication information carried by the handover request.

3. The method according to claim 1, wherein said determining of the adjustment period comprises:
    determining the adjustment period as a difference of the normal period and the period shortening step size.

4. The method according to claim 1, wherein said determining of the adjustment period comprises:
    determining the adjustment period as a product of the normal period and the period shortening step size.

5. The method according to claim 4, wherein the period shortening step size is 70%.

6. The method according to claim 1, wherein the minimum transmission period is set to be corresponding to the threshold.

7. The method according to claim 1, wherein the method further comprises:
    receiving at the base station a handover completion request from the terminal; and
    adjusting the base station to transmit the SNCAM to the terminal at the normal period.

8. A base station, comprising:
    a normal transmission module, configured to transmit a System Parameter and Neighbor Channel Assignment Message (SNCAM) to a terminal at a normal period;
    a receiving module, configured to receive a handover request from the terminal and trigger an adjustment module when receiving the handover request from the terminal; and
    the adjustment module, configured to adjust the base station to transmit the SNCAM to the terminal at a preset period, wherein the preset period is set to be shorter than the normal period and ensures that power consumption of the base station is lower than a threshold which would lead to power overload;
    wherein the adjustment module comprises:
    a determination module, configured to determine an adjustment period according to the normal period and a period shortening step size;
    a setting module, configured to judge whether the adjustment period is shorter than a minimum transmission period, if so, then to set the preset period at the minimum transmission period, otherwise to set the preset period at the adjustment period; and
    a transmission module, configured to transmit the SNCAM to the terminal at the preset period.

* * * * *